United States Patent [19]
Takahashi

[11] Patent Number: 4,774,853
[45] Date of Patent: Oct. 4, 1988

[54] CASE MOUNTING MECHANISM FOR USE WITH PNEUMATIC APPARATUS

[75] Inventor: Katsuaki Takahashi, Sohka, Japan

[73] Assignee: SMC Kabushiki Kaisha, Tokyo, Japan

[21] Appl. No.: 850,718

[22] Filed: Apr. 11, 1986

[30] Foreign Application Priority Data

Apr. 16, 1985 [JP] Japan .............................. 60-056279[U]
Apr. 16, 1985 [JP] Japan .............................. 60-056280[U]

[51] Int. Cl.$^4$ ......................... F16H 57/02; F01M 1/08
[52] U.S. Cl. .................................. 74/606 R; 210/168; 184/55.1
[58] Field of Search ............. 74/606 R; 261/DIG. 40, 261/24; 210/168, 416.4, 416.5, 459–463, 450, 451, 452; 70/276

[56] References Cited

U.S. PATENT DOCUMENTS

| 3,477,607 | 11/1969 | Fuzzell et al. | 220/39 |
| 4,075,099 | 2/1978 | Pelton et al. | 210/168 |
| 4,223,799 | 9/1980 | Eyster et al. | 220/230 |
| 4,253,954 | 3/1981 | Midkiff et al. | 210/168 |
| 4,354,946 | 10/1982 | Warlick et al. | 210/168 |
| 4,496,460 | 1/1985 | Haarstad et al. | 210/168 |

FOREIGN PATENT DOCUMENTS

| 520418 | 1/1956 | Canada | 210/168 |
| 2848795 | 5/1979 | Fed. Rep. of Germany | 210/168 |
| 57-27537 | 6/1982 | Japan |  |
| 57-27008 | 6/1982 | Japan |  |
| 84294 | 9/1935 | Sweden | 210/168 |
| 1549825 | 8/1979 | United Kingdom | 210/168 |

Primary Examiner—Gary L. Smith
Assistant Examiner—Vinh Luong
Attorney, Agent, or Firm—Burns, Doane, Swecker & Mathis

[57] ABSTRACT

A case mounting mechanism for use on a pneumatic device such as a filter, a lubricator, or the like includes a plurality of first ridges projecting inwardly from an edge of an annular groove defined in a body, each of the first ridges having a recess, and a plurality of second ridges projecting outwardly from a peripheral edge of a case guard and each having a projection. The case guard surrounding a case is mounted on the body by engagement between the first and second ridges with the projection on each second ridge engaging in the recess of each first ridge. The case is of a cylindrical shape having a ridge projecting axially outwardly from a terminal end thereof and defining a fluid passage therein. The case guard fitted over the cylindrical case has a hole defined in a terminal end thereof. The case and the case guard are combined together with the ridge on the terminal end of the case being fitted in the hole, and have peripheral edges detachably fitted in the annular groove of the body.

4 Claims, 5 Drawing Sheets

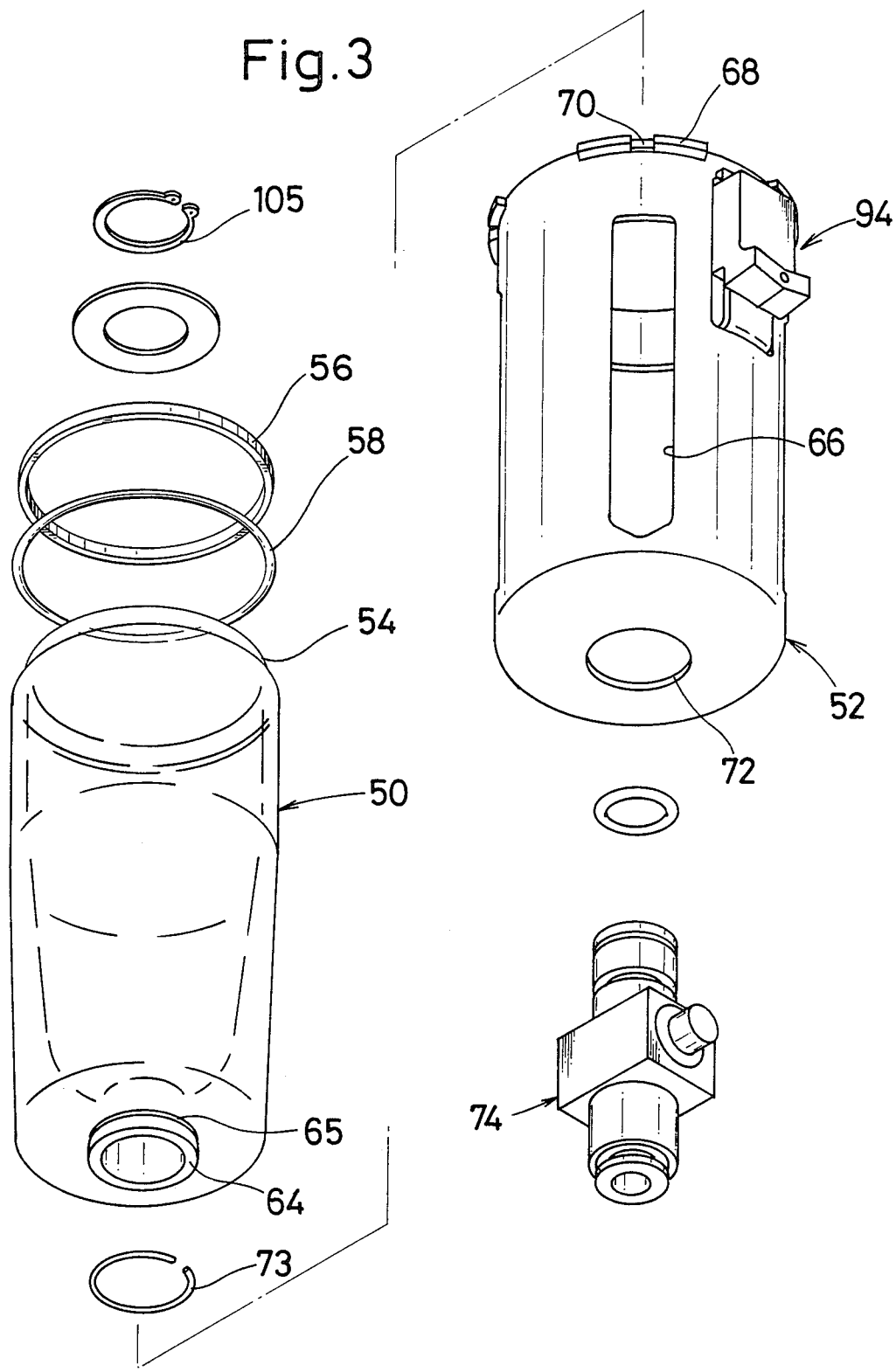

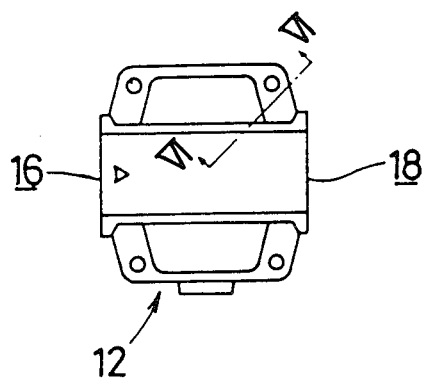
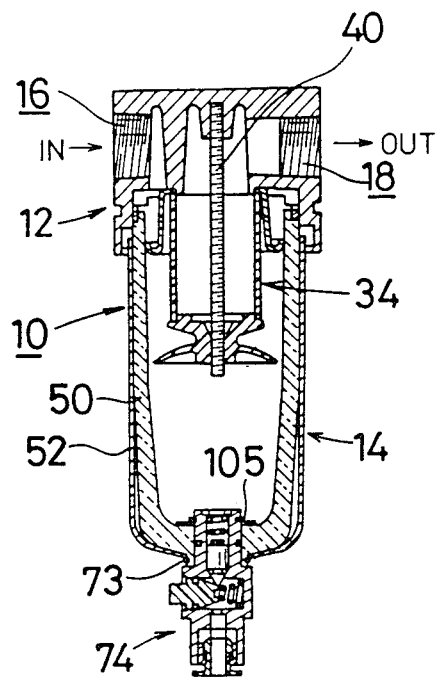
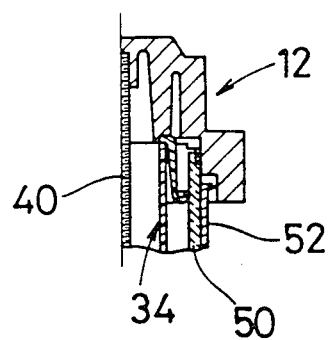

CASE MOUNTING MECHANISM FOR USE WITH PNEUMATIC APPARATUS

BACKGROUND OF THE INVENTION

The present invention relates to a case mounting mechanism, and more particularly to a case mounting mechanism for use with a pneumatic device such as a filter, a lubricator or the like which has a case guard for protecting a case in surrounding relation, the case mounting mechanism being capable of easily mounting the case guard and the case together on a body of the device and of preventing the case or the case guard from being easily detached from the body when there is a pressure in the case.

Pneumatic devices such as filters and lubricators have a case mounted on a body and accommodating a filter element or lubricating oil. The case is made of a transparent or semitransparent material to allow the user to visually check the amount of drain or lubricating oil in the case. Since the transparent or semitransparent material for the case is normally synthetic resin molded into a required shape, the case does not have a sufficient degree of mechanical strength. Therefore, the case is protected by a case guard of metal which surrounds the case.

When it is necessary to clean, replace, or otherwise service the case, the case and the case guard have to be detached from the body. If an attempt is made to remove the case from the body without confirming absence of an air pressure in the case when there is in fact a high air pressure remaining in the case, the case or the case guard is forced to fly apart from the body, resulting in the danger of damage to the operator and/or surrounding devices.

As a safeguard against such damage, the case or the case guard is mounted on the body in threaded engagement according to one conventional design. This arrangement is however disadvantageous in that it takes time to mount the case and the case guard on the body or detach them from the body, and also in that the body, the case, and the case guard are structurally complex and costly to manufacture since screw threads have to be formed on them.

The case and the case guard are inherently separate from each other. If they are detached from each other when they are dismounted from the body, the case may inadvertently drop off the case guard and may be broken upon hitting engagement with other object since the case of synthetic resin is relatively fragile.

SUMMARY OF THE INVENTION

In view of the aforesaid conventional shortcomings, it is an object of the present invention to provide a case mounting mechanism which securely combines a case and a case guard to allow them to be assembled easily on a body, to be handled simply, and to be attached to and detached from the body without the danger of damage to the operator and/or surrounding devices.

Another object of the present invention is to provide a case mounting mechanism comprising a body having an annular groove and a plurality of first ridges projecting inwardly from an edge of the annular groove, each of the first ridges having a recess, a case having a peripheral edge detachably fitted in the annular groove, a case guard detachably surrounding the case and having a peripheral edge detachably fitted in the annular groove, the case guard having a plurality of second ridges projecting outwardly from the peripheral edge thereof and each having a projection, the second ridges engaging the first ridges, respectively, with the projection on each the second ridge engaging in the recess of each the first ridge, and a lock mechanism mounted on the case guard for retaining the case and the case guard together on the body.

Still another object of the present invention is to provide a case mounting mechanism comprising a body having an annular groove, a cylindrical case of a transparent or semitransparent material having a ridge projecting axially outwardly from a terminal end thereof and defining a fluid passage therein, and a case guard fitted over the cylindrical case and having a hole defined in a terminal end thereof, the case and the case guard being combined together with the ridge fitted in the hole and having peripheral edges detachably fitted in the annular groove of the body.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is an exploded perspective view of the case, the case guard, and a draining mechanism of the case mounting mechanism of FIG. 1;

FIG. 4 is a plan view of the body of the case mounting mechanism;

FIG. 5 is a vertical cross-sectional view of the case mounting mechanism shown in FIG. 1;

FIG. 6 is a cross-sectional view taken along line VI—VI of FIG. 4; and

DETAILED DESCRIPTION OF THE PREFERRED EMBODIMENT

Figure 1:
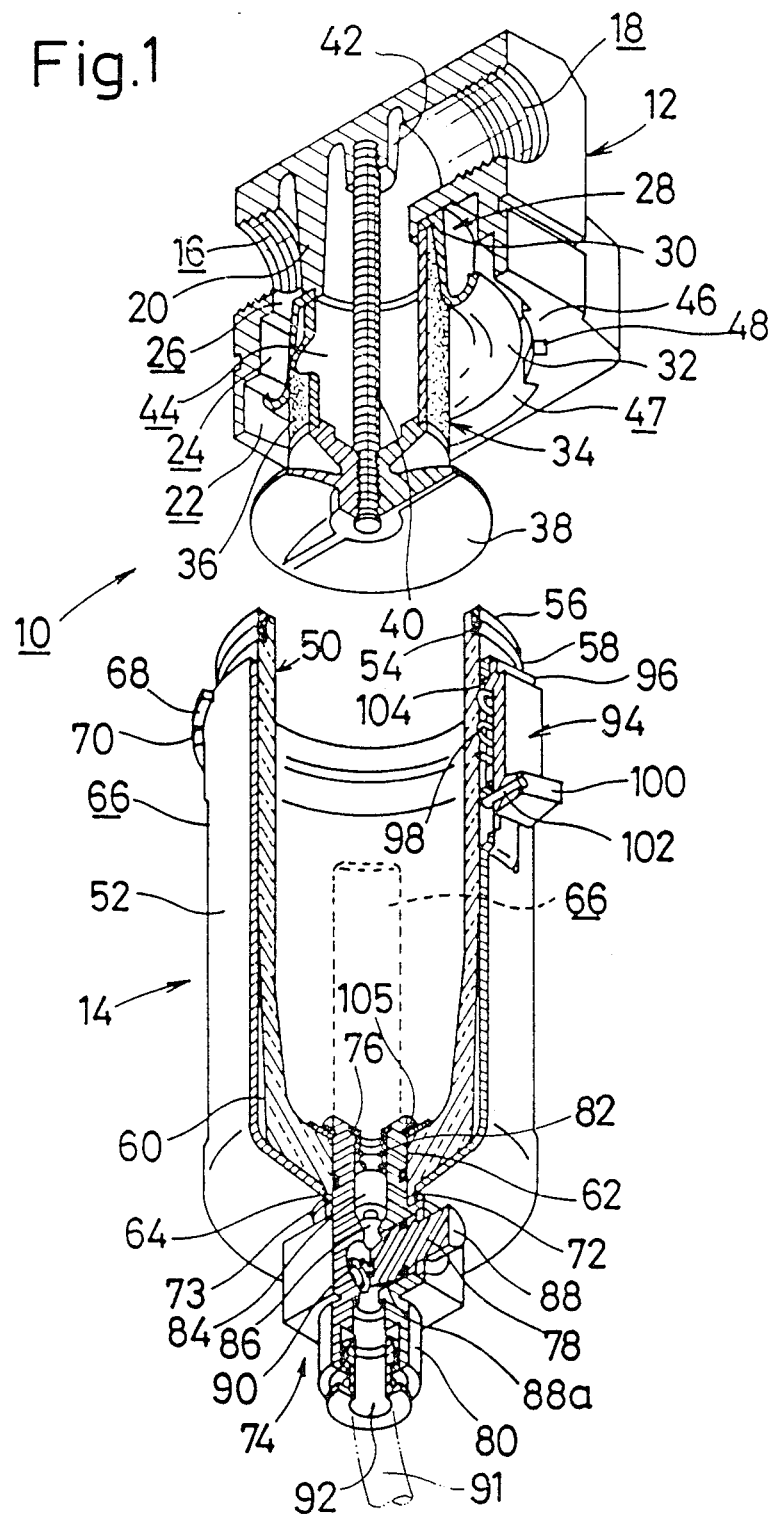
FIG. 1 is an exploded perspective view, partly cut away, of a case mounting mechanism having a body, a case, and a case guard according to the present invention.

FIG. 1 shows a pneumatic device 10 comprising a filter which includes a body 12 and a case assembly 14. The body 12 has an inlet port 16 and an outlet port 18 which are prevented by a partition 20 from mutual fluid communication. The body 12 also has a first annular groove 22 of a larger diameter defined in a lower portion of the body 12 and a second annular groove 24 of a smaller diameter defined adjacent to and held in communication with the first annular groove 22. The second annular groove 24 communicates with the inlet port 16 via a passage 26. A deflector 28 is disposed in the second annular groove 24 and securely mounted on the tip end of the partition 20 centrally in the body 12. The deflector 28 includes a horizontal annular flange 30, an intermediate cylindrical portion extending vertically downwardly from the flange 30, and a flaring annular portion 32 projecting upwardly and outwardly from the lower end of the intermediate cylindrical portion. A filter 34 is mounted in the deflector 28 and extends downwardly out of the deflector 28. The filter 34 comprises a cylindrical filter body 36 made of sintered metal powder and a baffle 38 attached to the lower end of the filter body 36 and having an upper surface curved downwardly in the radially outward direction.

The body 12 includes a boss 42 projecting downwardly and supporting an externally threaded rod 40 with its upper end threaded in the boss 42. The filter body 36 and the deflector 28 are securely mounted in the body 12 by the baffle 38 threaded over the lower end of the rod 40. The cylindrical filter body 36 defines a chamber 44 therein which is held in communication with the outlet port 18. The body 12 has a plurality of ridges 46 directed inwardly from the lower edge of the first annular groove 22, each of the ridges 46 having a central recess 48. An arcuate groove 47 is defined between two adjacent ones of the ridges 46.

The case assembly 14 comprises a cylindrical case 50 made of a transparent or semitransparent material such as glass or synthetic resin and a cylindrical case guard 52 made by drawing a metal sheet, the case guard 52 surrounding the case 50. The case 50 has an annular groove 54 defined in an upper outer peripheral edge, with a ring 56 of synthetic resin mounted in the annular groove 54. The ring 56 can easily be placed in the annular groove 54 by being fitted therein. A sealing O-ring 58 is fitted in an annular slot defined between the ring 56 and the lower edge of the annular groove 54. The sealing O-ring 58 is forcibly fitted in the annular slot and projects radially outwardly beyond the outer circumferential surface of the case 50.

The case 50 has its outside diameter progressively reduced from its upper edge toward the lower end thereof, leaving a gap 60 between the case 50 and the case guard 52. The case 50 has a thickness progressively increased downwardly along the gap 60 until the case 50 terminates in its bottom. The bottom of the case 50 has a circular hole 62 defined therein and an annular ridge 64 (FIG. 3) projecting axially from the center thereof. The annular ridge 64 has an annular groove 65 defined in its outer peripheral surface close to the case 50 for receiving a ring 73 (described later on).

Figure 2:
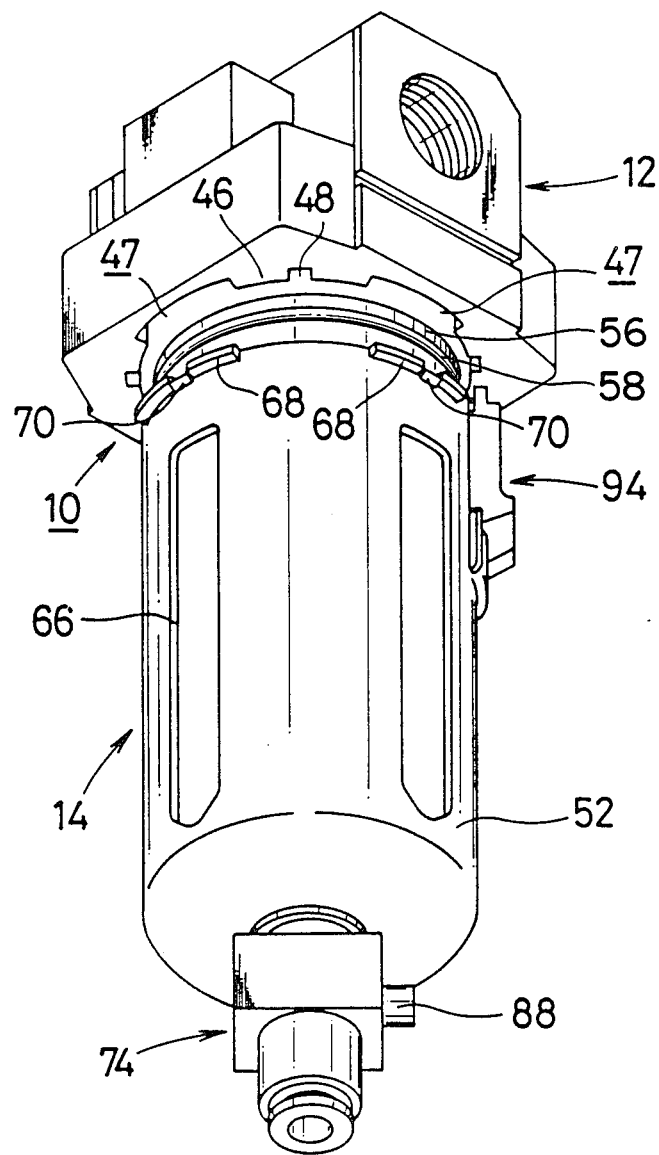
FIG. 2 is a perspective view of the case mounting mechanism of FIG. 1 with the body, the case, and the case guard which are about to be assembled together.

The case guard 52 is substantially complementary in shape to the case 50 so that it can neatly surround the case 50. The case guard 52 has a plurality of vertical slots 66 (better shown in FIG. 2) defined therein at equal angular intervals therearound to allow the interior of the case 50 to be visually checked through the slots 66. The case guard 52 also has a plurality of angularly spaced ridges 68 on its upper edge which project radially outwardly, each ridge 68 having a shape complementary to one of the arcuate grooves 47 between the two adjacent ridges 46 on the body 12. Each of the ridges 68 has a tooth 70 directed downwardly for engagement in one of the recesses 48. The case guard 52 has a lower end portion curved radially inwardly to terminate in a bottom having a central hole 72 receiving the annular ridge 64 of the case 50. When the annular ridge 64 is fitted in the central hole 72 to combine the case 50 and the case guard 52, the ring 73 (FIG. 3) larger in diameter than the hole 72 is fitted in the annular groove 65 of the ridge 64.

A drain cock 74 is mounted in the circular hole 62 of the bottom of the case 50. The drain cock 74 has a first cylindrical portion 76, a drain cock body 78, and a second cylindrical portion 80 projecting downwardly from the drain cock body 78. A valve body 84 which is normally urged downwardly by a coil spring 82 is disposed in the first cylindrical portion 76, the valve body 84 having a slanted tip end 86. The drain cock body 78 comprises a pusher member 88 having an exposed outer end and an inner end with its slanted surface 88a engaging the slanted tip end 86 of the valve body 84. The pusher member 88 is normally urged to move outwardly under the resiliency of a coil spring 90 acting on the inner end of the pusher member 88. A coupling member 92 is disposed in the second cylindrical portion 80 for connection to a tube 91 shown by the broken lines.

A lock mechanism 94 is mounted on the case guard 52. The lock mechanism 94 is described in detail in Japanese Utility Model Publication No. 57-27537 published on June 16, 1982 for "Casing mounting mechanism for a filter and a lubricator" and Japanese Utility Model Publication No. 57-27008 published on June 11, 1982 for "Casing mounting mechanism", both filed by the present applicant. Specifically, the lock mechanism 94 includes a stopper 96 having an inclined portion engaging in a recess defined in the case guard 52. The stopper 96 is normally urged to move upwardly by a meandering resilient member 98 which is held resiliently flexing by a lock button 100. The stopper 96 can be pressed against the body 12 in frictional engagement with the wall thereof which defines the first annular groove 22, by a tongue 104 slidable in the recess of the case guard 52. The tongue 104 and the lock button 100 are displaceable together by a pin member 102.

The drain cock 74 is fixed to the case 50 by means of a snap ring 105.

Figure 7:
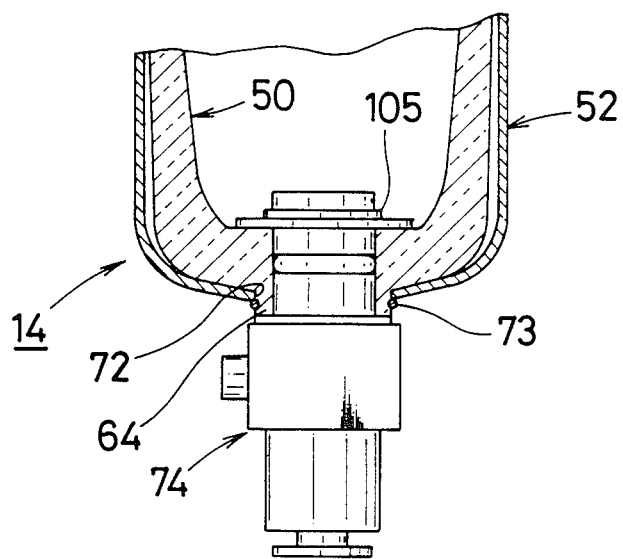
FIG. 7 is a fragmentary vertical cross-sectional view of the case, the case guard, and the draining mechanism as they are assembled together.

The case mounting mechanism of the above construction will operate as follows:

For mounting the case assembly 14 on the body 12, the annular ridge 64 of the case 50 is first fitted in the hole 72 of the case guard 52. Then, the ring 73 is fitted in the annular groove 65 of the ridge 64 to combine the case 50 and the case guard 52 together, as shown in FIG. 7. With the case 50 thus fixed to the case guard 52, the drain cock 74 is inserted in the hole 62 of the case 50 and secured thereto by the snap ring 105. Thereafter, the ring 56 on the case 50 is placed in the second annular groove 24 and the ridges 68 are fitted in the respective grooves 47. At this time, the case guard 52 and the case 50 are inserted together into the body 12 so that the ring 56 is directed toward the upper wall surface of the second annular groove 24, so that one surface of the stopper 96 of the lock mechanism 94 is pressed against the wall of the body 12 which defines the first annular groove 22. Then, the case guard 52 and the case 50 are turned together in a circumferential direction to bring the ridges 68 into engagement with the ridges 46. As a result, the projections 70 are fitted in the respective recesses 48, whereupon the body 12 and the case assembly 14 are firmly combined together against relative displacement as shown in FIG. 5.

When air is supplied under pressure to the inlet port 16, the air flows through the passage 26 and the second annular groove 24 into the first annular groove 22. During this time, the air under pressure is guided by the deflector 28, particularly the curved flaring annular portion 32 thereof, to flow forcibly around the filter body 36 and then enter the filter body 36 through the entire circumferential wall thereof. The filter body 36 removes dust particles from the air and allows the dust particles together with excess water and oil to fall from the baffle 38 into the case 50. The air filtered by the filter body 36 is discharged from the chamber 44 out of the outlet port 18.

The dust, water, and oil collected in the case 50 can easily be seen through the slots 66 defined in the case guard 52. When the collected mixture of dust, water, and oil has reached a certain amount, the pusher member 88 of the drain cock 74 is pushed. The slanted surface 88a of the pusher member 88 displaces upwardly the slanted tip end 86 of the valve body 84 against the resiliency of the coil spring 82. As a consequence, the collected mixture of dust, water, and oil flows from the first cylindrical portion 76 past the valve body 84 and through the second cylindrical portion 80 into the coupling member 92, from which the mixture is discharged through the tube 91.

When a deposit of dust or the like attached to the inner wall surface of the case 50 is to be removed, or for some other reasons, it may be desired to detach the case assembly 14 from the body 12. The case assembly 14 can be detached from the body 12 in the following manner:

The lock button 100 is pushed downwardly to release the stopper 96 from frictional engagement with the wall of the body 12 which defines the first annular groove 22. The case guard 52 is then lifted to displace the projections 70 out of the recesses 48. At this time, the case 50 is also lifted together with the case guard 52. Thereafter, the case guard 52 is turned circumferentially to position the ridges 68 in alignment with the grooves 47, respectively. The case guard 52 is moved away from the body 12 by displacing the ridges 68 through the respective grooves 47. Therefore, the case 50 and the case guard 52 can be handled as a unitary assembly at all times. The case 50 can be removed from the case guard 52 by detaching the ring 73.

If there is an air pressure acting in the inlet port 16 at this time, this air pressure acts in the case 50, tending to move the case 50 and the case guard 52 downwardly. Should this air pressure exist, the operator cannot easily unlock the lock mechanism 94 to lift the case guard 52. Therefore, in the presence of an air pressure in the case 50, the case guard 52 and the case 50 cannot be detached from the body 12. Stated otherwise, the case guard 52 and the case 50 can be detached from the body 12 in simple process only in the absence of an air pressure acting in the case 50.

With the arrangement of the present invention, as described above, the case of a lubricator or a filter cannot be detached from its body when there is an air pressure remaining in the case. In the absence of such an air pressure, the case and its case guard can easily be detached from the body simply by releasing a lock mechanism on the case guard. The case and the case guard can therefore be easily mounted on and detached from the body. Since the case can be held on the body solely by ridges projecting on the case guard, the overall structure is much simpler than that of conventional case mounting mechanisms. The case itself is not required to have ridges or other retaining members, unlike the case mounting mechanisms which have already been proposed. Consequently, the case can be manufactured inexpensively, and hence the entire case mounting mechanism is more economical.

Furthermore, inasmuch as the case and case guard of a lubricator, filter, or the like can be handled as a unitary assembly, the case is not subject accidental damage which would otherwise result from dropping off from the case guard. The case can therefore be handled quite easily. After the case has been cleaned, the case and the case guard can simply be mounted on the body. The case and the case guard can hence be maintained or serviced with ease. The case and the case guard can be manufactured less costly as the structure for attaching the case to the body is quite simple, so that the overall case mounting mechanism is inexpensive to manufacture.

Although a certain preferred embodiment has been shown and described, it should be understood that many changes and modifications may be made therein without departing from the scope of the appended claims.

What is claimed is:

1. A case mounting mechanism comprising:
   a body having first and second annular grooves;
   a cylindrical case of a transparent or semitransparent material having a ridge projecting axially outwardly from an end of the cylindrical case and defining a fluid passage therein, said ridge including an annular groove defined in an outer peripheral surface thereof;
   a case guard fitted over said cylindrical case and having a hole defined in a terminal end thereof, said case and said case guard being combined together with said ridge fitted in said hole and a ring fitted in said annular groove of the ridge to retain said case and said case guard together wherein said case guard includes a peripheral edge detachable fitted in said first annular groove of said body; and
   a draining mechanism mounted in said fluid passage defined in said ridge of the case at said end of the case.

2. A case mounting mechanism according to claim 1, wherein said body includes a plurality of first ridges projecting inwardly from an edge of said first annular groove, each of said first ridges having a recess;
   said case having a peripheral edge detachably fitted in said second annular groove;
   said case guard having a plurality of second ridges projecting outwardly from said peripheral edge thereof and each having a projection, said second ridges engaging said first ridges, respectively, said projection on each said second ridge engaging in said recess of each said first ridge;
   said first and second ridges extending perpendicular to the axial direction of the case.

3. A case mounting mechanism according to claim 2, wherein said first ridges are angularly spaced at equal intervals, said recess being positioned substantially centrally of each of said first ridges.

4. A case mounting mechanism according to claim 2, including a ring fitted over the peripheral edge of said case with an annular groove defined between said ring and said case, and a sealing ring fitted in said last-mentioned annular groove.

* * * * *